(12) United States Patent
Nemoto et al.

(10) Patent No.: US 7,869,970 B2
(45) Date of Patent: Jan. 11, 2011

(54) PROBE STRAIGHTNESS MEASURING METHOD

(75) Inventors: Kentaro Nemoto, Kawasaki (JP); Masaoki Yamagata, Kawasaki (JP)

(73) Assignee: Mitutoyo Corporation, Kawasaki-shi, Kanagawa (JP)

( * ) Notice: Subject to any disclaimer, the term of this patent is extended or adjusted under 35 U.S.C. 154(b) by 73 days.

(21) Appl. No.: 12/363,887

(22) Filed: Feb. 2, 2009

(65) Prior Publication Data

US 2009/0198472 A1 Aug. 6, 2009

(30) Foreign Application Priority Data

Feb. 4, 2008 (JP) ............... 2008-023759

(51) Int. Cl.
*G01C 17/38* (2006.01)
*G01C 25/00* (2006.01)

(52) U.S. Cl. .............. 702/95; 33/502; 33/549; 33/561; 702/152

(58) Field of Classification Search .......... 702/94, 702/95, 151, 152, 153; 33/502, 503, 549, 33/553, 561; 73/866.5; 250/230

See application file for complete search history.

(56) References Cited

U.S. PATENT DOCUMENTS

| 4,899,456 | A | 2/1990 | Morita et al. | |
|---|---|---|---|---|
| 6,513,253 | B2 * | 2/2003 | Matsuda et al. | 33/502 |
| 6,564,466 | B2 * | 5/2003 | Uwai | 33/549 |

FOREIGN PATENT DOCUMENTS

| EP | 1 865 281 | 12/2007 |
|---|---|---|
| JP | 64-053109 | 1/1989 |
| JP | 4-77243 | 12/1992 |
| JP | 2003-097943 | 4/2003 |

OTHER PUBLICATIONS

"Self-calibration method and software error correction for three-dimensional coordinate measuring machines using artefact measurements", Kruth J P et al., Measurement, Institute of Measurement and Control. London, GB, vol. 14, No. 2, Dec. 1, 1994, pp. 157-167, XP004040478, ISSN: 0263-2241.

(Continued)

*Primary Examiner*—John H Le
(74) *Attorney, Agent, or Firm*—Rankin, Hill & Clark LLP (57) ABSTRACT

A probe straightness measuring method includes: placing a measurement jig having a measurement reference surface with a known profile error on a stage surface of an XY stage so that the measurement reference surface is slanted in a moving direction of the XY stage; measuring a displaced position of the measurement piece by a displacement detector of the probe each time the XY stage is moved for a predetermined distance while controlling a driving actuator so that the measurement piece of a probe touches the measurement reference surface at a constant pressure; and calculating a straightness error of a measurement-piece moving mechanism on a basis of a measured position of the measurement piece obtained in the measuring, a nominal position of the measurement piece obtained by a calculation and a slant angle of the measurement reference surface.

6 Claims, 8 Drawing Sheets

OTHER PUBLICATIONS

Nawara L et al: "Uberprufung Von Koordinatenmessgeraten Mit Normalen" Technische Rundschau, Edition Colibri AG.; Waber, CH., vol. 80, No. 41, Oct. 7, 1998, pp. 54-57, XP000022879, ISSN: 1023-0823.

Shu D et al: "Synthetical Measuring Deviation of the Cantilever CMM" Microtecnic, AGIFA Verlag S.A. Zurich, CH, No. 4, Jan. 1, 1993, pp. 43-45, XP000466262, ISSN: 0026-2854.

Sartori S. Cresto P C, Di Ciommo M, Kancheva T K: "A way to improve the accuracy of a co-ordinate measuring machine", Measurement, vol. 6, No. 2, 1988, pp. 50-54, London.

Knapp W et al: "Der Vergleich Verschiedener Prufkorper" Technische Rundschau, Edition Colibri AG., Wabern, CH, vol. 82, No. 20, May 18, 1990, pp. 36-43 XP000127227, ISSN: 1023-0823.

* cited by examiner

PROBE STRAIGHTNESS MEASURING METHOD

BACKGROUND OF THE INVENTION

1. Field of the Invention

The present invention relates to a method for measuring a straightness of a probe. More specifically, the invention relates to a method for measuring a straightness of a probe of a surface texture measuring instrument that measures a surface texture such as a profile and surface roughness of an object to be measured using the probe.

2. Description of Related Art

Roughness measuring instruments, profile measuring instruments, scanning coordinate measuring instruments and the like are known as surface texture measuring instruments for measuring a surface texture such as a profile and surface roughness of an object to be measured using a probe.

For instance, a scanning coordinate measuring instrument includes a Z-axis slider that is capable of vertical (i.e. Z-axis direction) movement and a probe attached to the Z-axis slider, the probe having a stylus (measurement piece) that is capable of minute displacement in Z-axis direction. During a scanning measurement, the stylus of the probe is brought into contact with an object to be measured and the Z-axis slider is vertically moved so that a push amount (i.e. push amount of the measurement piece in Z-axis direction) becomes constant.

Traditionally, the probe attached to the scanning measuring instrument exhibits only a minute displacement of the stylus in Z-axis direction and a constant push amount as shown in a surface texture measuring tracer disclosed in Document 1 (JP-A-64-53109). Accordingly, a straightness of a linear guide mechanism for moving the measurement piece in Z-axis direction rarely exerts great influence on a measurement accuracy.

Recently, in order to achieve a high-speed and low-measuring-force measurement, a system has been proposed in which a measuring range of a probe itself is widened and the measuring force is actively controlled, so that a high-speed and low-measuring-force scanning measurement can be conducted with a scanning probe itself. However, when such a probe having wide measurement range is used, the straightness of a linear guide mechanism for moving the stylus in Z-axis direction greatly influences on the measurement accuracy.

Figure 7:
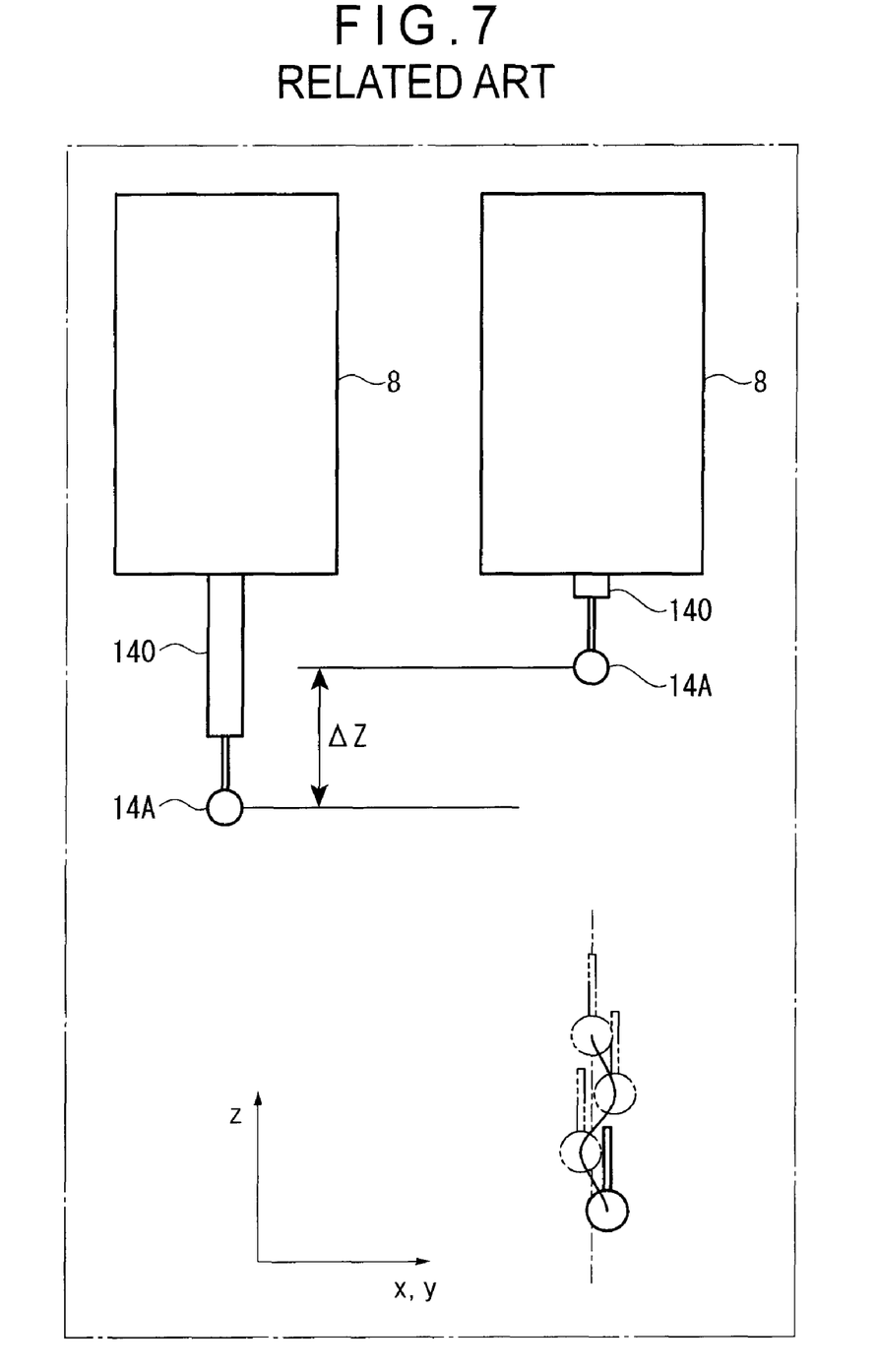
FIG. 7 is an illustration showing a straightness error when a measurement piece is displaced.

For instance, as shown in FIG. 7, when a stylus 14A of a probe 8 displaces in Z-axis direction by Δz, the stylus 14A deviates in X-axis direction or Y-axis direction according to the straightness of the linear guide mechanism provided in the probe 8. Then, a detected value based on the displacement in X-axis and Y-axis indicates a point different from a measured point of the stylus 14A, thereby causing a measurement error.

Thus, in order to correct a movement accuracy of the linear guide mechanism provided in the probe, the straightness is measured in a traditional measuring instrument and the like.

Figure 8A:
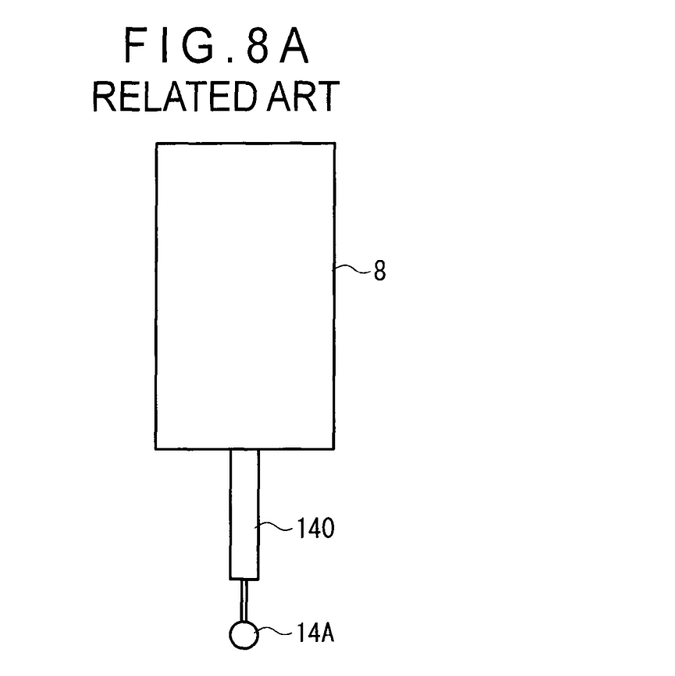
FIG. 8A is an illustration showing a process for measuring a straightness in a conventional arrangement.
Figure 8B:
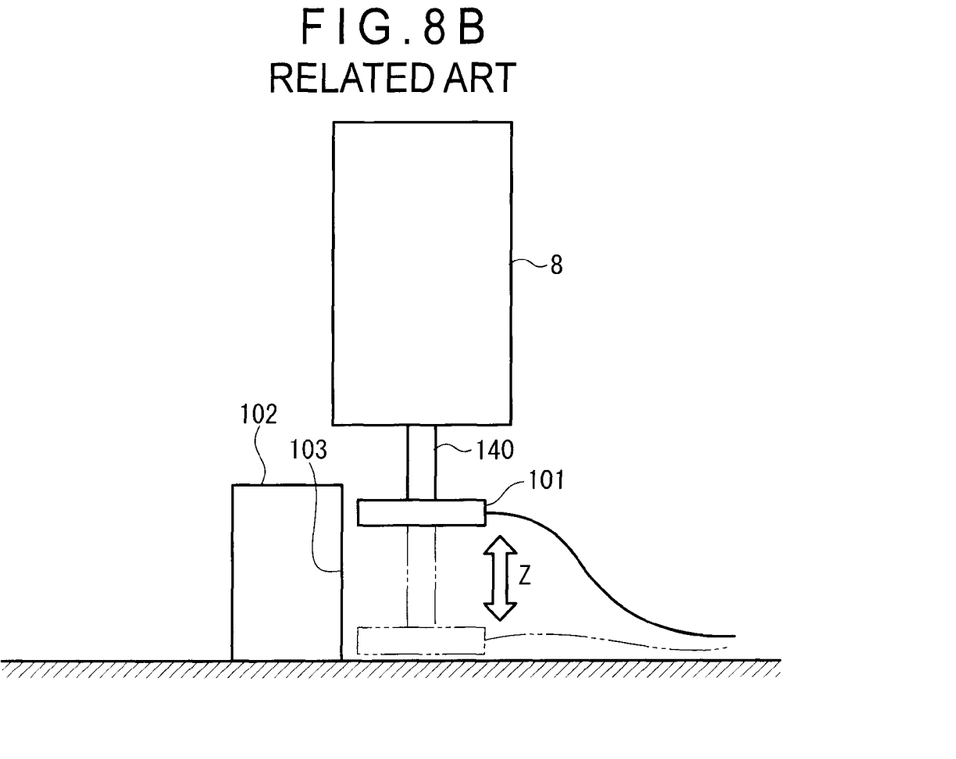
FIG. 8B is another illustration showing the process for measuring the straightness in the conventional arrangement.

In a traditional straightness measurement, as shown in FIGS. 8A and 8B, an electro-capacitance sensor 101 is attached to an end of a spindle 140 in place of a stylus 14A. Then, the spindle 140 is moved in Z-axis direction while measuring gaps between the sensor 101 and a datum surface 103 (reference plane) such as a gauge block 102 at respective positions, thereby obtaining a straightness of the spindle 140 (i.e. a linear guide mechanism for moving the spindle).

However, since the electro-capacitance sensor has to be attached in place of the stylus each time the straightness is measured, a separate electro-capacitance sensor has to be prepared.

Such a separate electro-capacitance sensor accompanies a great economic burden and attachment/detachment work. Further, the accuracy for measuring the straightness is influenced by the accuracy of the electro-capacitance sensor to be used.

Furthermore, since a bending force of a cable that connects the electro-capacitance sensor and a controller is applied as an external force on the linear guide mechanism for moving the spindle, the spindle depicts a movement locus different from that depicted without the electro-capacitance sensor being attached (i.e. with the stylus being attached), thus failing to provide an accurate straightness measurement.

SUMMARY OF THE INVENTION

An object of the invention is to provide a probe straightness measuring method capable of measuring a straightness of a probe in an actual use environment without requiring a separate straightness-measuring sensor.

A probe straightness measuring method according to an aspect of the invention is for measuring a straightness of a probe, the method including:

providing a surface texture measuring machine, the surface texture measuring machine comprising:

a table having a stage surface for an object to be measured to be placed, the table being movable in a direction parallel to the stage surface; and a probe, the probe comprising a casing, a measurement piece provided to the casing in a movable manner to be brought into contact with a surface of the object to be measured, a measurement-piece moving mechanism that displaces the measurement piece in a direction substantially orthogonal to the stage surface of the table and a displacement detector that detects a displacement of the measurement piece relative to the casing, a surface texture of the object to be measured being measured while relatively moving the table and the probe to bring the measurement piece of the probe into contact with the surface of the object to be measured;

placing a measurement jig having a measurement reference surface with a known profile error on the stage surface of the table so that the measurement reference surface is slanted in a moving direction of the table; measuring a displaced position of the measurement piece by the displacement detector after moving the table for a predetermined distance while controlling the measurement-piece moving mechanism so that the measurement piece of the probe touches the measurement reference surface of the measurement jig at a constant pressure; and calculating a straightness error of the probe on a basis of a measured position of the measurement piece obtained by the measuring, a nominal position of the measurement piece supposing that the measurement piece is ideally displaced without the straightness error and a slant angle of the measurement reference surface relative to the stage surface.

In the above aspect of the invention, the measurement jig having the measurement reference surface with a known profile error is placed on the stage surface of the table so that the measurement reference surface is slanted in the moving direction of the table.

Subsequently, in the measuring, the table is moved by the predetermined distance while controlling the measurement-piece moving mechanism so that the measurement piece of the probe touches the measurement reference surface of the measurement jig at a constant pressure, and the displaced position of the measurement piece is measured by the displacement detector of the probe.

Finally, in the calculating, the straightness of the probe is calculated on the basis of the measured position of the measurement piece obtained by the measuring, the nominal position of the measurement piece obtained through a calculation and the slant angle of the measurement reference surface. Specifically, a straightness error of the probe is calculated by the following formula:

$$\text{Straightness error of the probe} = \{Zreal(x,y) - Znom(x,y)\}/\tan \theta$$

where $Zreal(x, y)$ represents the measured position of the measurement piece obtained by the measuring, $Znom(x, y)$ represents the nominal position of the measurement piece obtained through the calculation and $\theta$ represents the slant angle of the measurement reference surface.

Accordingly, the straightness of the probe can be measured in an actual use environment without requiring a separate straightness-measuring sensor. Thus, economic burden can be reduced. In addition, attachment and detachment work of a straightness-measuring sensor is not required, so that efficiency of measurement process can be improved. Further, the accuracy of the straightness is not influenced by the accuracy of the electrostatic capacity sensor. Furthermore, since the bending force of a cable that connects an electro-capacitance sensor to a controller is not applied to the measurement piece as an external force, highly accurate measurement can be achieved.

In the probe straightness measuring method according to the above aspect of the invention, it is preferable that the surface texture measuring instrument includes: a movable member adapted to receive the probe at an end thereof; an X-axis driving mechanism and a Y-axis driving mechanism for relatively displacing the table and the movable member in an X-axis direction and a Y-axis direction orthogonal with each other in a plane parallel to the stage surface; an X-axis displacement detector and a Y-axis displacement detector for detecting a relative displacement of the table and the movable member in the X-axis direction and the Y-axis direction respectively; a Z-axis driving mechanism for displacing the movable member in a Z-axis direction orthogonal to the X-axis direction and the Y-axis direction; and a Z-axis displacement detector for detecting a displacement of the movable member in the Z-axis direction.

According to the above arrangement, the X-axis driving mechanism and the Y-axis driving mechanism are driven to relatively displace the table and the movable member in X-axis direction and Y-axis direction, and the Z-axis driving mechanism is driven to bring the measurement piece of the probe into contact with the surface of the object to be measured while displacing the probe in Z-axis direction. While driving the measurement-piece moving mechanism so that a push amount of the probe becomes constant (i.e. with a constant measuring force), the X-axis driving mechanism and the Y-axis driving mechanism are driven to relatively move the table and the movable member in X-axis direction and Y-axis direction.

The surface texture and roughness of the object to be measured can be scanned with a constant measuring force during the relative movement by, for instance, retrieving the detected value from the X-axis displacement detector, Y-axis displacement detector, Z-axis displacement detector and the displacement detector of the probe and calculating a coordinate value of a measurement point at which the measurement piece is in contact with the object to be measured.

The scanning measurement is conducted while driving the measurement-piece moving mechanism so that the measuring force of the measurement piece of the scanning probe becomes constant. At this time, since the straightness error of the measurement-piece moving mechanism of the probe is known, the measurement point of the object to be measured with which the measurement piece is in contact can be highly accurately obtained by correcting the detected value of the respective axis-displacement detectors (X and Y-axis displacement detectors) with the straightness error.

Accordingly, the deterioration of the measurement accuracy caused on account of a linear guide mechanism of the probe and the like that surfaces when the scanning measurement is conducted while driving the measurement-piece moving mechanism can be avoided. Thus, since it is not required to assemble and process the linear guide mechanism with high accuracy or to assemble the scanning probe with high attachment accuracy, the processing and assembling work can be facilitated and the burden on the workers can be reduced.

In the probe straightness measuring method according to the above aspect of the invention, it is preferable that the probe includes a base provided to the casing, the measurement piece provided to the base and provided with a contact portion at an end thereof, a vibration element that vibrates the measurement piece, and a detection element that detects the vibration of the measurement piece and outputs the vibration as a detection signal.

According to the above arrangement, the measurement piece is brought into contact with the surface of the object to be measured while the measurement piece is vibrated by the vibration element. Since the vibration of the measurement piece is restricted when the measurement piece touches the surface of the object to be measured, the detection signal from the detection element is attenuated. Accordingly, highly accurate scanning measurement can be achieved by conducting the scanning measurement while controlling the measurement-piece moving mechanism so that the attenuation of the detection signal from the detection element becomes always constant.

DETAILED DESCRIPTION OF PREFERRED EMBODIMENT(S)

Figure 1:
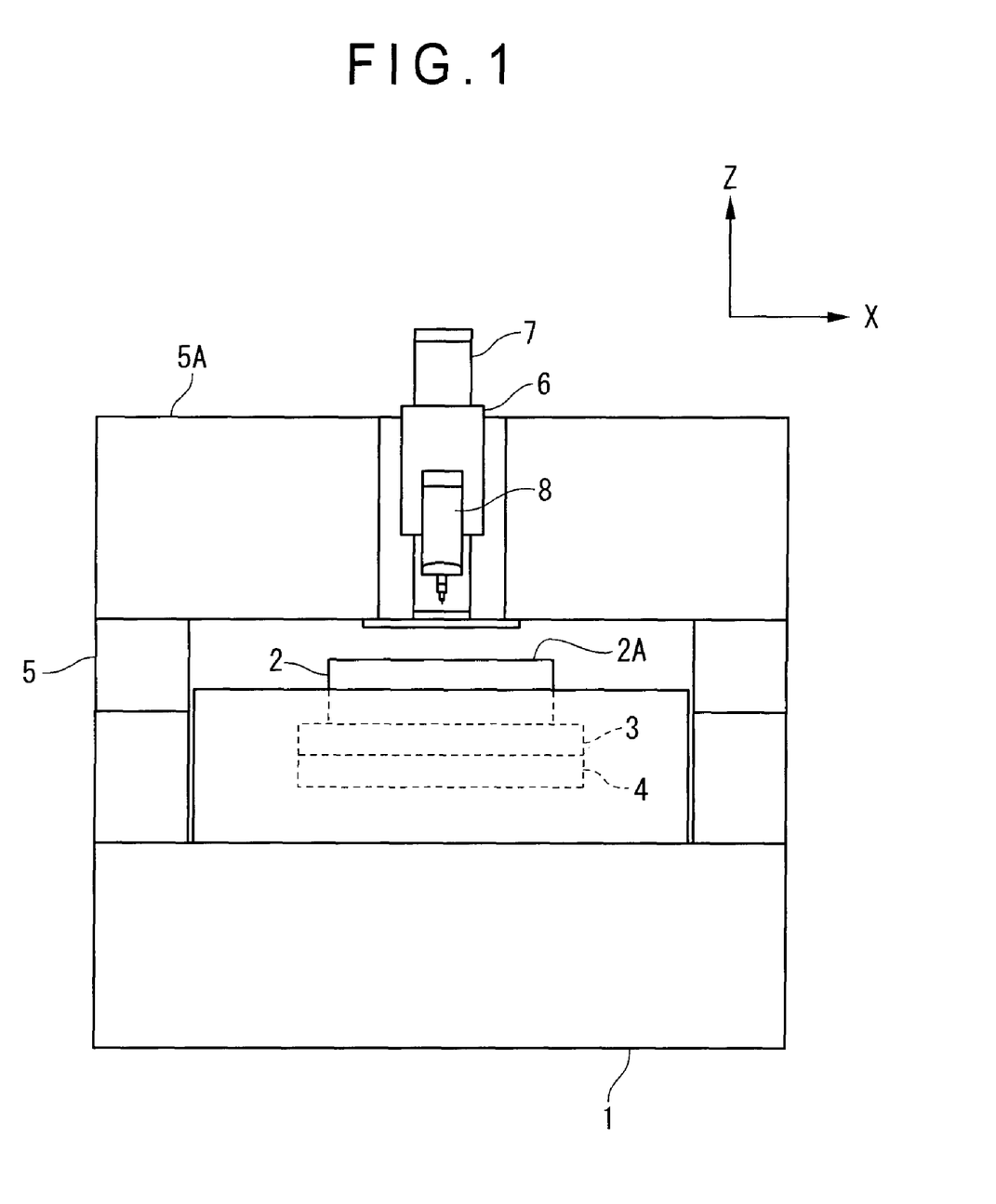
FIG. 1 is a front elevational view showing a surface texture measuring instrument according to an embodiment of the invention.
Figure 2:
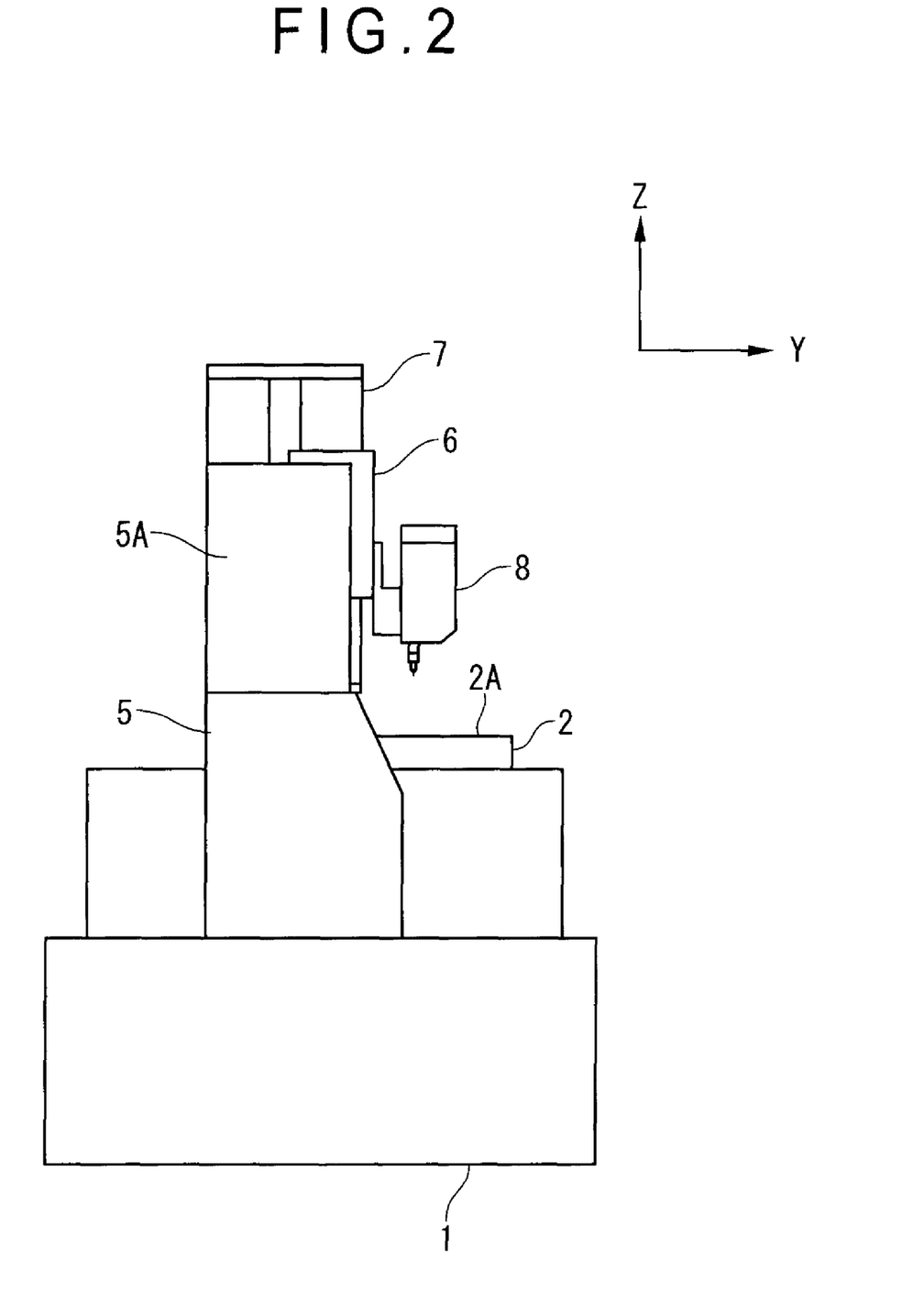
FIG. 2 is a side elevational view of the above embodiment.

Explanation of Entire Arrangement (see FIGS. 1 and 2)

FIG. 1 is a front elevational view showing a surface texture measuring instrument according to the present embodiment. FIG. 2 is a side elevational view showing the surface texture measuring instrument.

The surface texture measuring instrument of the embodiment has: a base 1; an XY stage 2 as a table on which an object to be measured is placed; an X-axis driving mechanism 3 and a Y-axis driving mechanism 4 for displacing the XY stage 2 in X-axis direction and Y-axis direction orthogonal with each other in a horizontal plane; a portal frame 5 spanning over an upper side of the base 1; a Z-axis slider 6 (movable member) provided on a cross rail 5A of the portal frame 5; a Z-axis driving mechanism 7 for displacing the Z-axis slider 6 in Z-axis direction orthogonal to X-axis and Y-axis directions; and a probe 8 attached to the Z-axis slider 6.

The XY stage 2 has a flat stage surface 2A on which the object is placed. The XY stage 2 is movable in X and Y-axis directions orthogonal to each other in a plane parallel to the stage surface 2A.

The X-axis driving mechanism 3 and the Y-axis driving mechanism 4 include, for instance, a ball screw axis and a nut screwed to the ball screw axis.

Similarly to the X-axis driving mechanism 3 and the Y-axis driving mechanism 4, the Z-axis driving mechanism 7 includes, for instance, a ball screw axis and a nut screwed to the ball screw axis.

Figure 3:
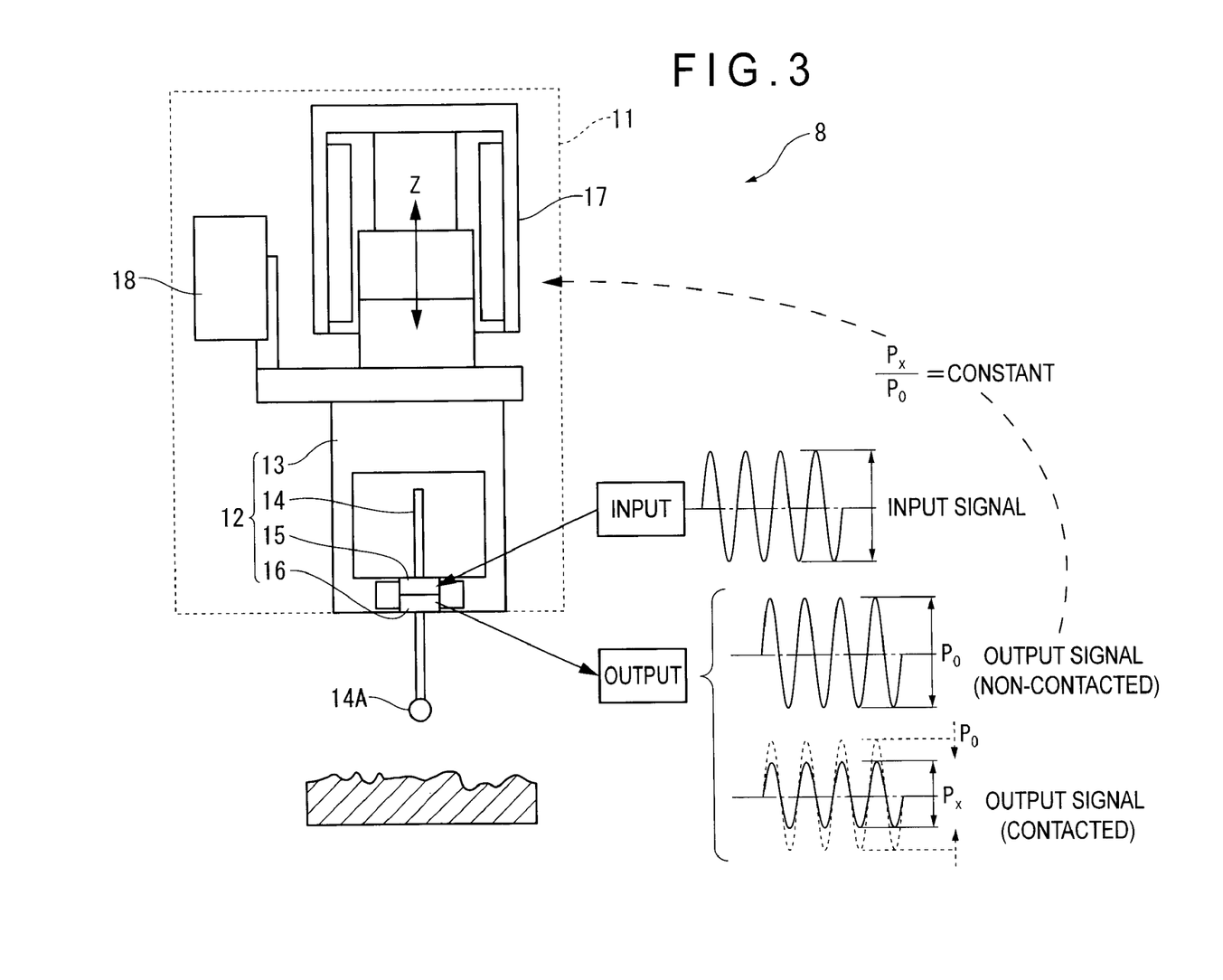
FIG. 3 is an illustration showing a probe of the above embodiment.

Description of Probe 8 (see FIG. 3)

The probe 8 includes: a casing 11 attached to the Z-axis slider 6; a sensor unit 12 provided to the casing 11; a driving actuator 17 (measurement-piece moving mechanism) for displacing the sensor unit 12 in Z-axis direction; and a sensor displacement detector 18 (displacement detector), including a scale and a detector head, for detecting a displacement (i.e. displacement of the sensor unit 12 relative to the casing 11) of the sensor unit 12 by the driving actuator 17.

The sensor unit 12 includes: a metal base 13; an oscillator 14 (measurement piece) provided to the base 13 parallel to Z-axis direction to be in contact with a surface of the object to be measured; a vibration element 15 for (axially) vibrating the oscillator 14; and a detection element 16 for detecting the vibration of the oscillator 14 and outputting the vibration as a detection signal. A stylus 14A (contact portion) provided by a diamond chip, ruby and the like is adhered on an end of the oscillator 14. The vibration element 15 and the detection element 16 are respectively provided by a single piezoelectric element, which are respectively adhered on top and bottom sides of the base 13.

When an input signal with a specific frequency and amplitude is given to the vibration element 15 of the sensor unit 12, an output signal with a specific frequency and amplitude is given by the detection element 16.

When an input signal having a resonance frequency of the oscillator 14 and a predetermined amplitude is applied to the vibration element 15 while the stylus 14A is not in contact with the object to be measured, the oscillator 14 is resonated to provide an output signal of an amplitude Po to the detection element 16. When the stylus 14A is brought into contact with the object to be measured, the amplitude of the output signal is attenuated from Po to Px.

Accordingly, when the sensor unit 12 is to be in contact with the object to be measured, by controlling the distance between the sensor unit 12 and the object to be measured by the driving actuator 17 so that an attenuation rate (Px/Po) becomes always constant, the profile and roughness of the object can be measured with a constant measuring force.

Figure 4:
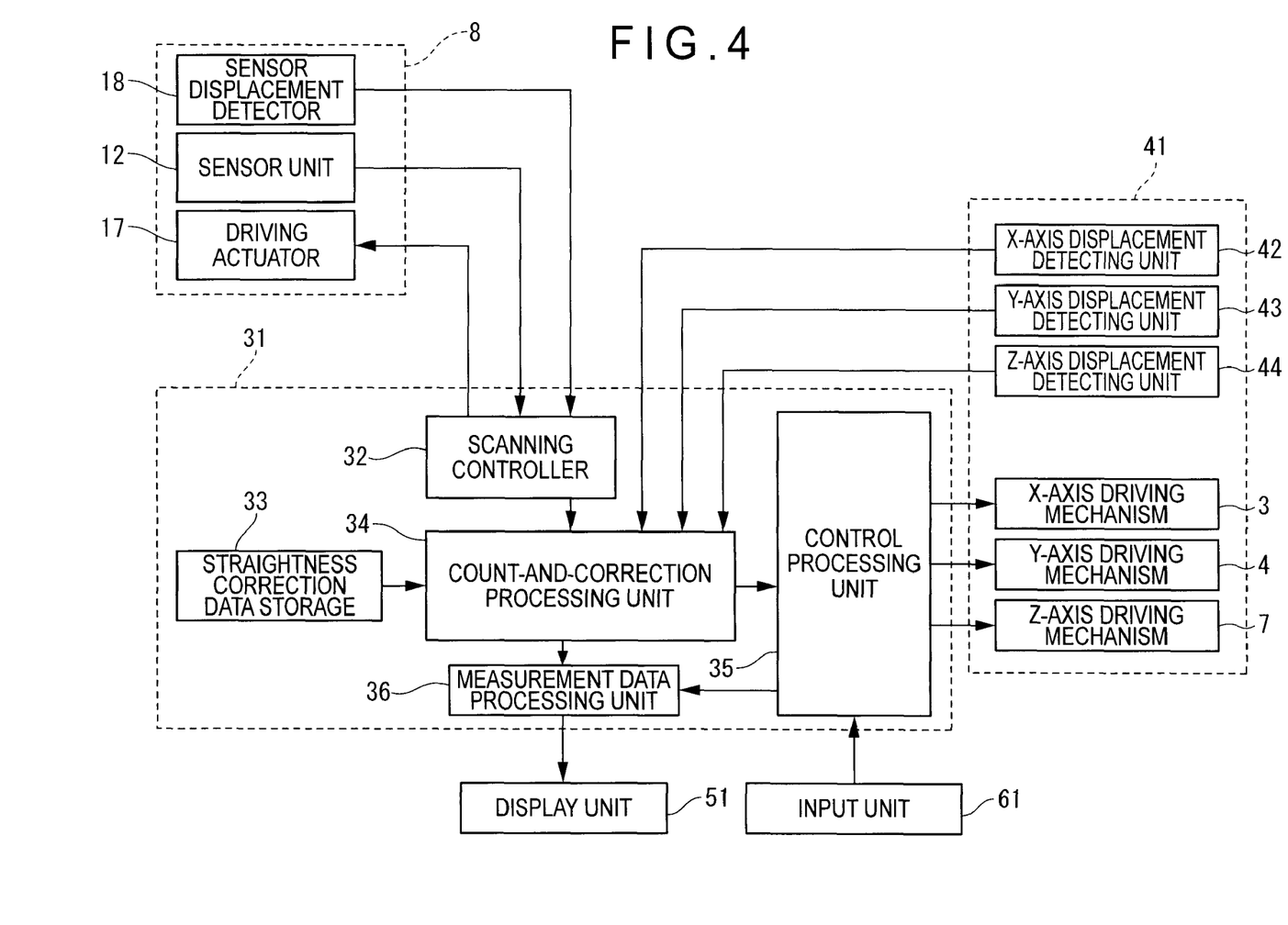
FIG. 4 is an illustration showing a control system of the above embodiment.

Description of Control System (see FIG. 4)

A control system includes a controller 31, the probe 8, a drive-displacement detecting device 41, a display unit 51 and an input unit 61.

The drive-displacement detecting device 41 includes: the X-axis driving mechanism 3; the Y-axis driving mechanism 4; the Z-axis driving mechanism 7; an X-axis displacement detecting unit 42 and a Y-axis displacement detecting unit 43 respectively for detecting a displacement of the XY stage 2 in X and Y-axis directions; and a Z-axis displacement detecting unit 44 for detecting the displacement of the Z-axis slider 6 in Z-axis direction.

The controller 31 includes: a scanning controller 32 for driving the driving actuator 17 in response to the output signal from the sensor unit 12 of the probe 8 and the sensor displacement detector 18; a straightness correction data storage 33; a count-and-correction processing unit 34; a control processing unit 35 for controlling the driving mechanisms 3, 4, 7 based on the output from the count-and-correction processing unit 34; and a measurement data processing unit 36 for displaying the output from the count-and-correction processing unit 34 on the display unit 51.

The straightness errors at respective displacement positions in Z-axis direction of the driving actuator 17 of the probe 8 are stored in the straightness correction data storage 33. Specifically, the straightness errors in X and Y-axis directions of the driving actuator 17 at respective positions in Z-axis direction are stored as correction data.

The count-and-correction processing unit 34 reads correction data corresponding to a detected value of the sensor displacement detector 18 from the straightness correction data storage 33 and corrects the detected value of the respective displacement detectors, i.e. X and Y-axis displacement detectors 42, 43 with the correction data to calculate the coordinate value of the stylus 14A.

Figure 5:
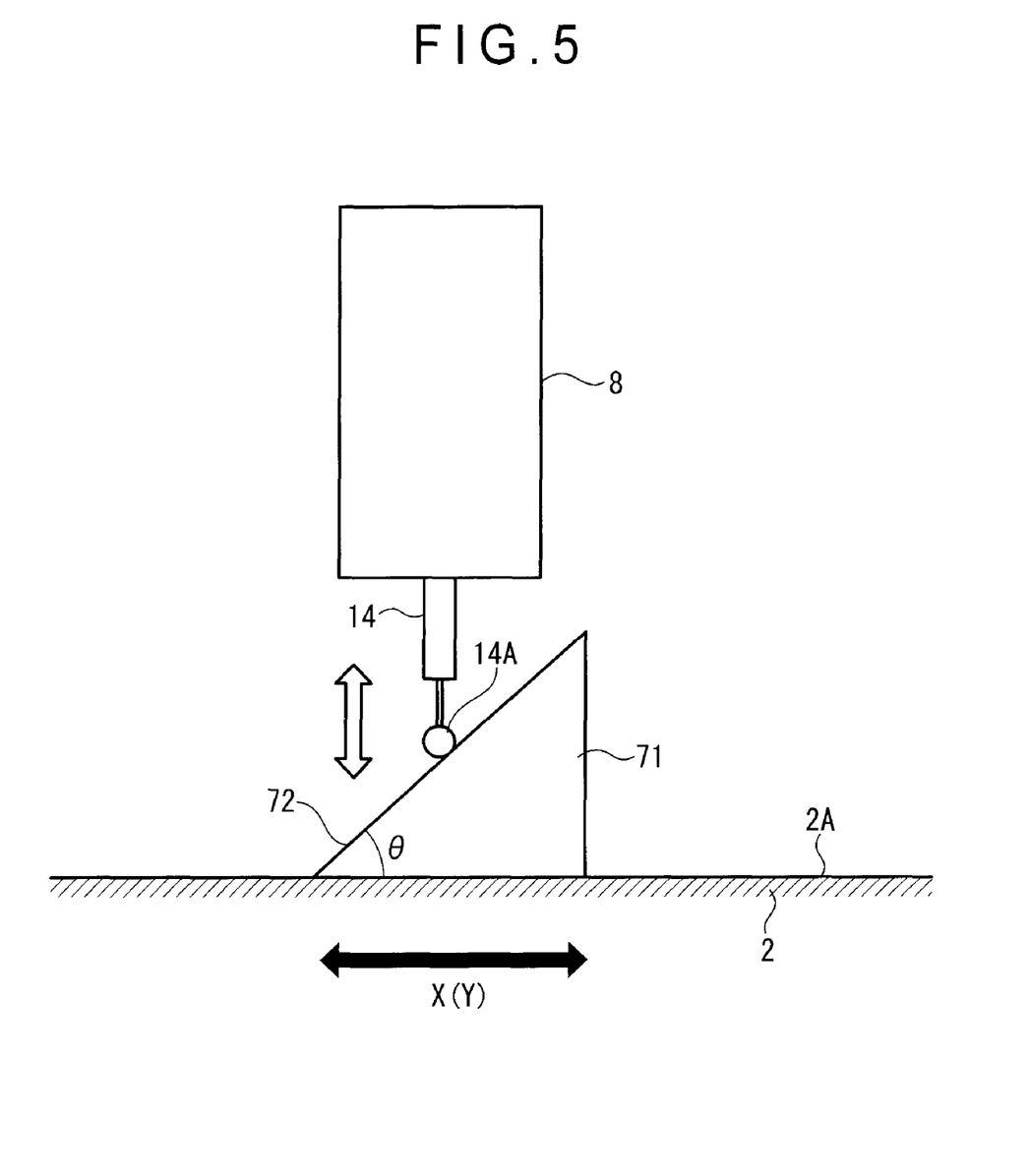
FIG. 5 is an illustration showing a process for measuring a straightness in the above embodiment.
Figure 6:
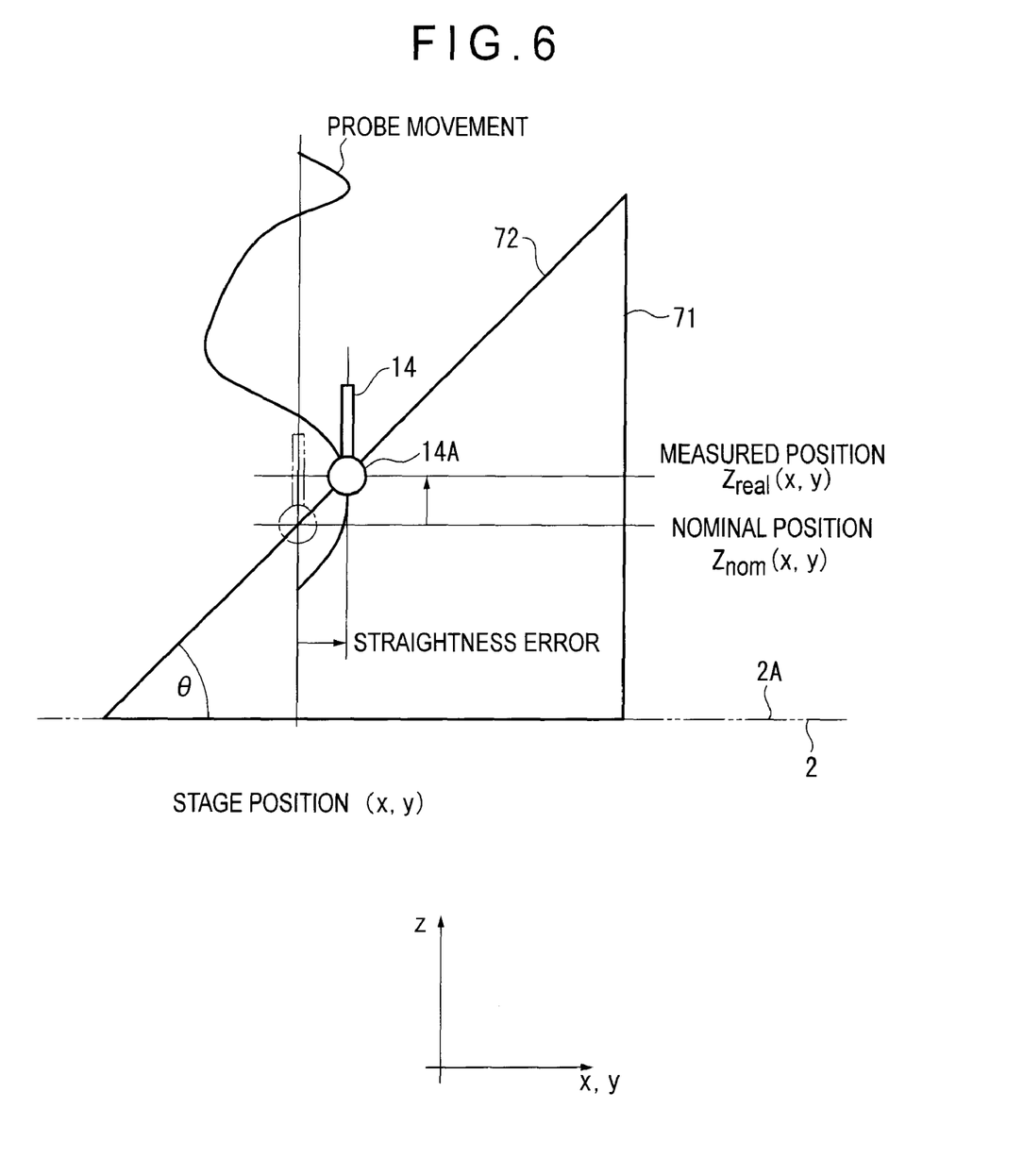
FIG. 6 is an explanatory illustration showing a calculating process for a straightness error in the above embodiment.

Explanation of Straightness Measurement (see FIGS. 5 and 6)

FIG. 5 shows a process of a straightness measurement. A measurement jig 71 used for the straightness measurement is prepared in advance.

The measurement jig 71 is a block having a right-angled triangle profile on a front side (FIG. 5) and a rectangular profile in plan view. The measurement jig 71 is provided with a measurement reference surface 72 on an oblique side thereof that is highly accurately finished and has a known profile error. For instance, the measurement jig 71 is provided by a rectangular prism of which slant angle θ of the measurement reference surface 72 relative to a bottom side is 45°.

Initially, the measurement jig 71 is mounted on the stage surface 2A of the XY stage 2 so that the measurement reference surface 72 is slanted in a moving direction (e.g. X-axis direction) of the XY stage 2 (preparation step).

Subsequently, the driving actuator 17 of the probe 8 is driven to displace the sensor unit 12 in Z-axis direction to bring the stylus 14A attached to the end of the oscillator 14 into contact with the measurement reference surface 72 of the measurement jig 71. The XY stage 2 is moved in X-axis direction while controllably driving the driving actuator 17 so that the stylus 14A touches the measurement reference surface 72 of the measurement jig 71 at a constant force, and the displaced position of the stylus 14A at each time is measured by the sensor displacement detector 18 (measurement step).

The straightness error of the probe can be represented by the following formula, where the measured position of the stylus 14A obtained during the measurement step when the XY stage 2 is moved in X-axis direction is Zreal (x, y), a nominal position of the stylus 14A obtained by calculation, i.e. the position of the stylus 14A supposing that the stylus 14A is ideally displaced in Z-axis direction without any straightness error, is Znom (x, y), and the slant angle of the measurement reference surface 72 is θ.

Straightness error of the probe={Zreal(x,y)−Znom(x,y)}/tan θ

The calculation is conducted by the count-and-correction processing unit 34 (calculation step). In other words, the count-and-correction processing unit 34 stores the slant angle θ of the measurement reference surface 72 in advance. Then, the nominal position of the stylus 14A is calculated based on the slant angle θ and the movement distance of the XY stage 2. The straightness error of the probe is calculated based on the nominal position and the measured position of the stylus 14A.

Next, after turning the measurement jig 71 by 90 degrees, the driving actuator 17 of the probe 8 is driven to bring the stylus 14A attached to the end of the oscillator 14 into contact with the measurement reference surface 72 of the measurement jig 71. The XY stage 2 is moved in Y-axis direction while controllably driving the driving actuator 17 so that the stylus 14A touches the measurement reference surface 72 of the measurement jig 71 at a constant force, and the displaced position of the stylus 14A is measured by the sensor displacement detector 18 (measurement step). Subsequently, the straightness error of the probe is calculated in the same manner (calculation step).

Thus obtained straightness errors of the probe, i.e. the straightness errors of the stylus 14A in X and Y-axis directions at respective positions in Z-axis direction, are stored in the straightness correction data storage 33 before measuring an object.

Description of Scanning Measurement

During the scanning measurement, the X-axis driving mechanism 3 and the Y-axis driving mechanism 4 are driven to displace the XY stage 2 in X-axis direction and Y-axis direction, and the Z-axis driving mechanism 7 is driven to bring the stylus 14A of the probe 8 into contact with the surface of the object to be measured while displacing the probe 8 in Z-axis direction.

While driving the driving actuator 17 to keep the output signal from the detection element 16 of the probe 8 at a constant level, the X-axis driving mechanism 3 and the Y-axis driving mechanism 4 are driven to move the XY stage 2 in X-axis direction and Y-axis direction.

During the measurement process, after reading the detected values of the sensor displacement detector 18 at a predetermined time interval, correction values corresponding to the detected values are read from the straightness correction data storage 33. Then, the detected values of the X and Y-axes displacement detecting units 42 and 43 are corrected by the correction values to calculate the coordinate values of the stylus 14A.

Thus, the deterioration of the measurement accuracy caused on account of the straightness of the driving actuator 17 (linear guide mechanism) of the probe 8 can be avoided, so that highly accurate scanning measurement can be achieved.

Advantage of Embodiment

According to the above embodiment, the straightness of the probe can be measured in an actual use environment without requiring a separate straightness-measuring sensor. Thus, economic burden can be reduced. In addition, attachment and detachment work of a straightness-measuring sensor is not required, so that efficiency of measurement process can be improved. Further, the accuracy of the straightness is not influenced by the accuracy of the electrostatic capacity sensor. Furthermore, since the bending force of a cable that connects an electro-capacitance sensor to a controller is not applied to the measurement piece as an external force, highly accurate measurement can be achieved.

The straightness errors obtained through a straightness measuring process are stored in the straightness correction data storage 33 and the correction values corresponding to the detected values of the sensor displacement detector 18 are read from the straightness correction data storage 33. Subsequently, the detected values of the X and Y-axes displacement detecting units 42 and 43 are corrected by the correction values to calculate the coordinate value of the stylus 14A. Accordingly, the deterioration of the measurement accuracy on account of the straightness of the linear guide mechanism of the probe 8 can be avoided.

Thus, since it is not required to assemble and process the linear guide mechanism with high accuracy or to assemble the scanning probe with high attachment accuracy, the processing and assembling work can be facilitated and the burden on the workers can be reduced.

Modification

It should be noted that the scope of the invention is not limited to the above embodiment but includes modifications and improvements as long as an object of the invention can be achieved.

Though the XY stage 2 is movable in X-axis and Y-axis directions in the above embodiment, the XY stage 2 and the Z-axis slider 6 as the movable member may be configured to be relatively displaceable in X and Y-axis directions orthogonal with each other in a horizontal plane. For instance, the stage 2 may be configured to be displaceable in Y-axis direction while the Z-axis slider 6 is movable in X-axis and Z-axis directions.

Though the above embodiment is directed to a three-dimensional measuring instrument in which the stage 2 and the Z-axis slider 6 attached with the probe 8 are relatively moved in X, Y and Z-axis directions, the present invention may be applied to an instrument in which the Z-axis slider 6 attached with the probe 8 is movable in Z-axis direction and the stage 2 is movable in only one of the X-axis and Y-axis directions (i.e. two-dimensional measuring instrument).

Though a vibrating scanning probe 8 is used in the above embodiment, other arrangements are possible. For instance, the probe may be configured to detect a displacement of the oscillator generated when the stylus 14A touches an object to be measured or may be configured to detect a deflection of the oscillator when the stylus 14A touches an object to be measured.

Though a rectangular prism is used as the measurement jig 71 in the above embodiment, other arrangements are possible. For instance, a flat measurement jig having a measurement reference surface 72 (e.g. an optical flat) may be placed on the stage surface 2A of the stage 2 using an additional base and the like so that the measurement reference surface 72 is slanted.

The inclination angle θ of the measurement reference surface 72 may not be 45° as in the embodiment but may be the other angle.

The priority application Number JP 2008-023759 upon which this patent application is based is hereby incorporated by reference.

What is claimed is:

1. A probe straightness measuring method for measuring a straightness of a probe, comprising:

providing a surface texture measuring machine, the surface texture measuring machine comprising:

a table having a stage surface for an object to be measured to be placed, the table being movable in a direction parallel to the stage surface; and a probe comprising a casing, a measurement piece provided to the casing in a movable manner to be brought into contact with a surface of the object to be measured, a measurement-piece moving mechanism that displaces the measurement piece in a direction substantially orthogonal to the stage surface of the table and a displacement detector that detects a displacement of the measurement piece relative to the casing, a surface texture of the object to be measured being measured while relatively moving the table and the probe to bring the measurement piece of the probe into contact with the surface of the object to be measured, the straightness of the probe being measured when the probe is displaced in the direction substantially orthogonal to the stage surface of the table by the measurement-piece moving mechanism;

placing a measurement jig having a measurement reference surface with a known profile error and with a slant angle relative to the stage surface on the stage surface of the table so that the measurement reference surface is slanted in a moving direction of the table;

measuring a displaced position of the measurement piece by the displacement detector after moving the table for a predetermined distance while controlling the measurement-piece moving mechanism so that the measurement piece of the probe touches the measurement reference surface of the measurement jig at a constant pressure; and calculating a straightness error of the probe on a basis of a measured position of the measurement piece obtained by the measuring, a nominal position of the measurement piece supposing that the measurement piece is ideally displaced without the straightness error and the slant angle of the measurement reference surface.

2. The probe straightness measuring method according to claim 1, wherein in the calculating, the straightness error of the probe is calculated based on a formula as follows:

$$\text{Straightness error of the probe} = \{Zreal(x,y) - Znom(x,y)\}/\tan\theta$$

where Zreal(x, y) represents the measured position of the measurement piece obtained by the measuring, Znom(x, y) represents the nominal position of the measurement piece and θ represents the slant angle of the measurement reference surface relative to the stage surface.

3. The probe straightness measuring method according to claim 2, wherein the probe includes a base provided to the casing, the measurement piece provided to the base and provided with a contact portion at an end thereof, a vibration element that vibrates the measurement piece, and a detection element that detects the vibration of the measurement piece and outputs the vibration as a detection signal.

4. The probe straightness measuring method according to claim 1, wherein the surface texture measuring instrument includes: a movable member adapted to receive the probe at an end thereof; an X-axis driving mechanism and a Y-axis driving mechanism for relatively displacing the table and the movable member in an X-axis direction and a Y-axis direction orthogonal with each other in a plane parallel to the stage surface; an X-axis displacement detector and a Y-axis displacement detector for detecting a relative displacement of the table and the movable member in the X-axis direction and the Y-axis direction respectively; a Z-axis driving mechanism for displacing the movable member in a Z-axis direction orthogonal to the X-axis direction and the Y-axis direction; and a Z-axis displacement detector for detecting a displacement of the movable member in the Z-axis direction.

5. The probe straightness measuring method according to claim 4, wherein the probe includes a base provided to the casing, the measurement piece provided to the base and provided with a contact portion at an end thereof, a vibration element that vibrates the measurement piece, and a detection element that detects the vibration of the measurement piece and outputs the vibration as a detection signal.

6. The probe straightness measuring method according to claim 1, wherein the probe includes a base provided to the casing, the measurement piece provided to the base and provided with a contact portion at an end thereof, a vibration element that vibrates the measurement piece, and a detection element that detects the vibration of the measurement piece and outputs the vibration as a detection signal.

* * * * *